UNITED STATES PATENT OFFICE.

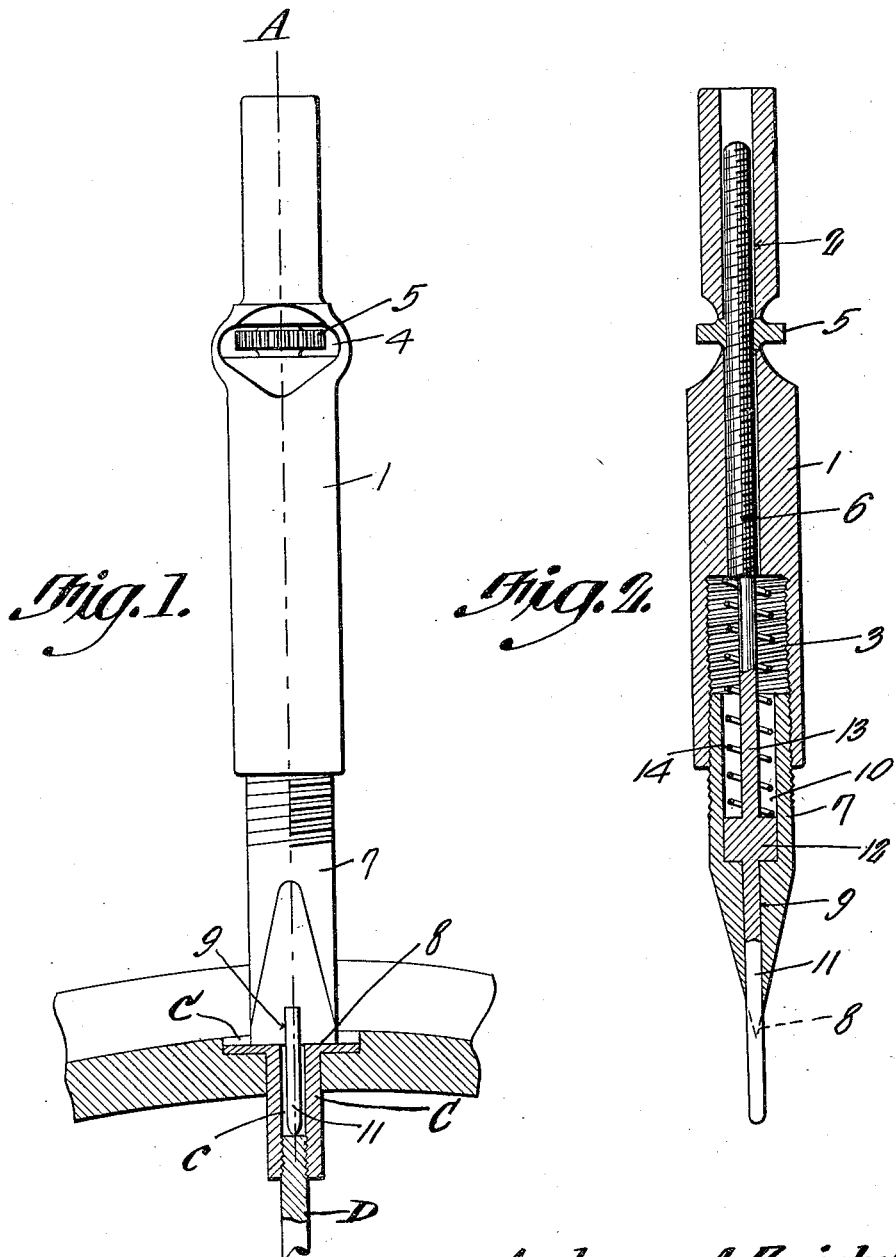

AMBROSE A. ZWIEBEL, OF WILKES-BARRE, PENNSYLVANIA.

SCREW-DRIVER.

1,069,312.  Specification of Letters Patent.  Patented Aug. 5, 1913.

Application filed November 4, 1912. Serial No. 729,520.

*To all whom it may concern:*

Be it known that I, AMBROSE A. ZWIEBEL, a citizen of the United States, residing at Wilkes-Barre, in the county of Luzerne and State of Pennsylvania, have invented a new and useful Screw-Driver, of which the following is a specification.

This invention relates to screw drivers particularly designed for use in connecting spokes to the rims of wheels having wire spokes.

Heretofore considerable difficulty has been experienced in so connecting all of the spokes to a rim as to leave the wheel perfectly true, this being due primarily to the fact that certain of the spokes are usually extended greater distances into the rim than are other spokes.

One of the objects of the present invention is to provide means whereby the screw caps or nuts are applied readily to the threaded ends of the spokes but can only be placed a predetermined distance thereon so that, when all of the screw caps or nuts have been positioned, it will be found that the distances between the screw caps and the hub are all the same and that the wheel is, consequently, perfectly true.

Another object is to provide a device of this character which can be adjusted readily so as to permit the screw cap to engage the spoke for any desired distance.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the device in position upon a screw cap, said cap and the adjacent portion of a wheel rim being shown in section. Fig. 2 is a section through the tool, said section being taken on the line A—B Fig. 1.

Referring to the figures by characters of reference 1 designates the handle portion of the tool the same being provided with a bore 2 extending longitudinally therethrough, one end of said bore being counter-bored, as at 3 and interiorly screw threaded. A slot 4 extends through the handle portion 1 and mounted for rotation within this slot is an adjusting nut 5. Said nut engages a feed screw 6 which is loosely mounted in the bore 2 and is adapted to slide therein.

The counter-bore 3 is adapted to receive the exteriorly screw threaded head 7, the free end of which is flattened and tapered to form an edge 8 adapted to be seated in the kerf in a screw cap or nut. A bore 9 is arranged longitudinally within the head 7 and intersects the edge 8, the inner portion of this bore being counter-bored, as at 10. A gage pin 11 is slidably mounted in the bore 9 and has an enlargement 12 which is slidably mounted in the counter-bore 10. A stem 13 projects from the enlargement and a coiled spring 14 is mounted on this stem and bears at one end against the enlargement and at its other end against the inner end of the counter-bore 3.

When the enlargement 12 is in engagement with the inner end of the counter-bore 10 and the screw 6 is bearing against the stem 13, it will be apparent that pin 11 will be projected its greatest distance beyond the bore 9, as shown in Fig. 2, and will be held against movement back into the bore.

In using the tool, the gage pin 11 is inserted into the opening $c$ in the screw cap C until the edge 8 of the tool is brought into the kerf $c'$ of the cap. The cap is placed on the threaded end of a spoke D and is turned by means of the screw driver. The cap will thus feed onto the end of the spoke until the end of the spoke comes against the gage pin 11 whereupon further rotation of the cap will be prevented. Thus by screwing all of the caps onto their respective spokes after the tool has been adjusted, as described, it will be seen that all of the caps will be adjusted the same distances onto the spokes and, therefore, the wheel will be perfectly true after the spokes have been tightened. Should it be desired to adjust the tool so as to permit the screw caps to draw the spokes farther thereinto, the feed screw 6 is shifted longitudinally by means of nut 5 so as to withdraw from the stem 13. Thus, when the spoke presses against the gage pin, while the cap is being screwed onto the spoke, it will push the gage pin back into the head 7 until stem 13 is brought to a stop by coming against the feed screw 6. As soon as the screw is removed from the cap C, spring 14, which is placed under stress during the inward movement of the gage pin 11, will promptly return the gage pin to its initial position.

What is claimed is:—

1. A screw driver having a gage pin intersecting the active edge thereof, said pin being slidable longitudinally within the head, and adjustable means for controlling the sliding movement of the pin.

2. A screw driver having a longitudinal bore intersecting the active edge thereof, a gage pin slidably mounted within the bore, yielding means within the screw driver for pressing the pin normally beyond the active edge of the screw driver, and adjustable means within the screw driver for limiting the inward movement of the gage pin.

3. A screw driver including a head having a longitudinal bore intersecting the active edge thereof, a gage pin slidably mounted in the bore, yielding means within the head for pressing the pin normally beyond said active edge, and adjustable means within the screw driver for limiting the inward movement of the gage pin.

4. A screw driver including a handle portion having a longitudinal bore and a screw threaded counter-bore, a feed screw slidably mounted in the bore, a feed nut engaging the screw and projecting outwardly from the handle, a head detachably engaging the counter-bored portion of the handle and having an active edge and a longitudinal bore intersecting said edge, there being a counter-bore in the inner portion of the head, a gage pin slidably mounted in the bore in the head and provided with an enlargement seated within the counter-bore in the head, a stem projecting from the enlargement and adapted to be contacted by the feed screw, and spring housed within the counter-bore and extending around the stem.

In testimony that I claim the foregoing as my own, I have hereto affixed my signature in the presence of two witnesses.

AMBROSE A. ZWIEBEL.

Witnesses:
 CHAS. W. DANA,
 EMMA L. NYGREN.